(12) United States Patent
Kim et al.

(10) Patent No.: US 10,438,758 B2
(45) Date of Patent: Oct. 8, 2019

(54) TRUNK SWITCH MODULE FOR VEHICLE

(71) Applicants: HYUNDAI MOTOR COMPANY, Seoul (KR); KIA MOTORS CORPORATION, Seoul (KR)

(72) Inventors: Won Ho Kim, Gwangmyeong-si (KR); Keun Soo Kim, Suwon-si (KR); Jong Il Shin, Busan (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/797,276

(22) Filed: Oct. 30, 2017

(65) Prior Publication Data

US 2018/0247777 A1 Aug. 30, 2018

(30) Foreign Application Priority Data

Feb. 27, 2017 (KR) .......................... 10-2017-0025734

(51) Int. Cl.
| | |
|---|---|
| *H01H 13/06* | (2006.01) |
| *H01H 13/50* | (2006.01) |
| *B60R 13/00* | (2006.01) |
| *B60R 16/00* | (2006.01) |
| *B60J 5/10* | (2006.01) |

(52) U.S. Cl.
CPC ........... *H01H 13/06* (2013.01); *B60R 13/005* (2013.01); *B60R 16/005* (2013.01); *H01H 13/50* (2013.01); *B60J 5/101* (2013.01); *H01H 2231/026* (2013.01)

(58) Field of Classification Search
CPC .... H01H 13/06; H01H 2223/002; H01H 9/04; H01H 13/86; H01H 2009/048; H01H 13/14; H01H 3/125; H01H 13/7065; H01H 13/04; H01H 13/20; H01H 13/50; H01H 2231/026; B60R 13/005; B60R 16/005; B60J 5/101

USPC ........... 200/302.1, 302.2, 5 A, 314, 341–345
See application file for complete search history.

(56) References Cited

U.S. PATENT DOCUMENTS

| 5,493,087 A * | 2/1996 | Yoshida ................. H01H 13/06 |
| | | 200/302.1 |
| 7,244,897 B2 | 7/2007 | Villagrasa et al. |

(Continued)

FOREIGN PATENT DOCUMENTS

| EP | 2282316 A1 | 2/2011 |
| JP | 3195376 | 1/2015 |
| KR | 10-152621 B1 | 6/1998 |

(Continued)

*Primary Examiner* — Ahmed M Saeed
(74) *Attorney, Agent, or Firm* — Morgan, Lewis & Bockius LLP

(57) ABSTRACT

A trunk switch module for a vehicle includes: a housing, of which a rear side is partially inserted into a trunk lid of the vehicle, having a mounting space at a front side of the housing; a trunk switch disposed in the mounting space to selectively open the trunk lid according to an operation of a user; a cover assembly attached to a front edge of the housing to close the opened front side of the housing, the cover assembly having a button sealing unit which corresponds to the trunk switch; a protection film attached to the front surface of the cover assembly; and an emblem mounted on the cover assembly at a front side of the protection film.

7 Claims, 4 Drawing Sheets

(56) References Cited

U.S. PATENT DOCUMENTS

2016/0093452 A1\* 3/2016 Zercoe ................ H01H 13/023
200/314
2016/0343522 A1\* 11/2016 Kang .................... H01H 9/285

FOREIGN PATENT DOCUMENTS

| KR | 10-2006-0093691 A | 8/2006 |
| KR | 10-0799769 B1 | 1/2008 |
| KR | 10-2012-0020712 A | 3/2012 |
| KR | 10-2012-0053914 A | 5/2012 |
| KR | 10-2012-0075374 A | 7/2012 |
| KR | 10-2012-0079460 A | 7/2012 |
| KR | 10-2014-0075374 A | 6/2014 |
| KR | 20-0477718 Y1 | 7/2015 |
| KR | 10-1566914 B1 | 11/2015 |
| KR | 10-1594334 B1 | 2/2016 |
| KR | 10-2016-0137001 A | 11/2016 |

\* cited by examiner

TRUNK SWITCH MODULE FOR VEHICLE

CROSS-REFERENCE TO RELATED APPLICATION

This application claims priority to and the benefit of Korean Patent Application No. 10-2017-0025734 filed in the Korean Intellectual Property Office on Feb. 27, 2017, the entire content of which is incorporated herein by reference.

TECHNICAL FIELD

The present disclosure relates to a trunk switch module for a vehicle, and more particularly, to a trunk switch module for a vehicle, which encapsulates a trunk switch unlocking a trunk lid in an emblem attached to the trunk lid to enhance an external appearance of a trunk and enhance a degree of design freedom of the trunk.

BACKGROUND

In general, a trunk loading a cargo is provided at the rear of a vehicle. The trunk is constituted by a trunk body forming a trunk space and a trunk lid for opening/closing the trunk body.

In addition, a trunk switch for opening the trunk as an unlocking device capable of unlocking the trunk lid outside the trunk is installed in the trunk lid.

Further, the trunk switch is connected with a trunk latch having locking and unlocking functions of the trunk lid and the trunk latch unlocks the trunk lid by actuation of the trunk switch to open the trunk body.

In recent years, a trunk switch is installed in an emblem representing a manufacturer at the rear of a vehicle to actuate the trunk switch through an operation such as pressing or pulling the emblem.

For example, there are trucks switch which draws the emblem, which rotates the emblem, and which pushes the emblem are disclosed.

Among them, the case of an emblem integrated trunk switch in the related art is configured in a structure in which when a front surface of the emblem is pressed or depressed by making the emblem into a button, the emblem moves to the inside or the outside while being guided by a button stroke guide of a switch body to turn on or off a switch assembly.

However, the emblem integrated trunk switch in the related art has a disadvantage in that when water is introduced between the button stroke guide and the switch body, the water is drained due to a capillary phenomenon.

In addition, since an area between the button stroke guide and the switch body is large, when the introduced water is frozen by a low temperature in the wintertime, an operation stroke of a button significantly increases, and as a result, it is difficult to operate the trunk switch and it is impossible to operate the trunk switch when the switch is frozen at a subzero temperature.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a trunk switch module for a vehicle, which prevent water from being introduced to the inside of a trunk by integrally providing a button sealing unit to correspond to a trunk switch positioned at an upper portion of an emblem and adopting a cover assembly to which a protection film is applied to enhance watertightness and prevent an operation malfunction phenomenon of the trunk switch due to freezing of the water, thereby enhancing switch operating performance.

An exemplary embodiment of the present disclosure provides a trunk switch module for a vehicle, including: a housing of which a rear side is partially inserted into a trunk lid of the vehicle, having a mounting space at a front side of the housing; a trunk switch disposed in the mounting space to selectively open the trunk lid according to an operation of a user; a cover assembly attached to a front edge of the housing to close opened front side of the housing, the cover assembly having a button sealing unit which corresponds to the trunk switch; a protection film attached to the front surface of the cover assembly; and an emblem mounted on the cover assembly at a front side of the protection film.

The cover assembly may include a main body having a mounting hole at an upper portion of the main body to correspond to the trunk switch so that the button sealing unit is provided, a flange unit integrally formed on an outer circumference of the main body, and a vehicle body sealing unit integrally formed on a rear surface of the flange unit.

An engagement protrusion may be integrally formed so that a lower part of the button sealing unit covers the outer circumference in the main body below the mounting hole.

The button sealing unit and the vehicle body sealing unit may be insert-injected into the main body and the flange unit, respectively.

The button sealing unit and the vehicle body sealing unit may be thermoplastic poly urethane (TPU) materials.

A coupling groove may be formed on the rear surface of the main body to correspond to a coupling protrusion formed in the housing.

The main body may be coupled to the housing through ultrasonic fusion while the coupling protrusion is inserted into the coupling groove.

The housing is ultrasonically fused to the rear of the main body to be coupled to the main body.

The front surface of the main body may be painted with the same color as a body of the vehicle.

The protection film may be an anti-chipping film that protects a painted surface painted on the front surface of the main body.

the trunk switch may include a tack switch mounted on the insider of the rear of the housing, and a push block mounted on the mounting space to move forward and backward to correspond to the tack switch so as to selectively contact the tack switch and turning on or off the tack switch while selectively contacting the tack switch.

A contact protrusion contacting the tack switch may be formed at the rear of the push block.

An air vent hole may be formed at one side of a lower end of the housing for ventilation in the mounting space.

A label tape may be attached to the emblem so that a position of the trunk switch is displayed on an upper front surface corresponding to the trunk switch.

A mounting pad for fixing the housing in the trunk lid may be mounted on the rear of the housing.

As described above, according to an exemplary embodiment of the present disclosure, a trunk switch module for a vehicle prevents water from being introduced to the inside of a trunk through a trunk switch by integrally providing a button sealing unit to correspond to a trunk switch positioned at an upper portion of an emblem and adopting a cover assembly to which a protection film is applied to enhance watertightness and prevent an operation malfunction phenomenon of the trunk switch due to freezing of the water, thereby enhancing switch operating performance.

Further, the trunk switch is integrally configured in the emblem and a paint having the same color as the vehicle is applied to the cover assembly to enhance a degree of design freedom of a trunk lid.

In addition, a vehicle body sealing unit is integrally formed on a rear surface of the cover assembly contacting a vehicle body to minimize friction with a vehicle body painting surface and enhance sealing performance.

Furthermore since the watertightness can be enhanced by applying the cover assembly without a separate waterproof device, a structure can be simplified and manufacturing cost can be reduced.

DETAILED DESCRIPTION OF THE EMBODIMENTS

Figure 1:
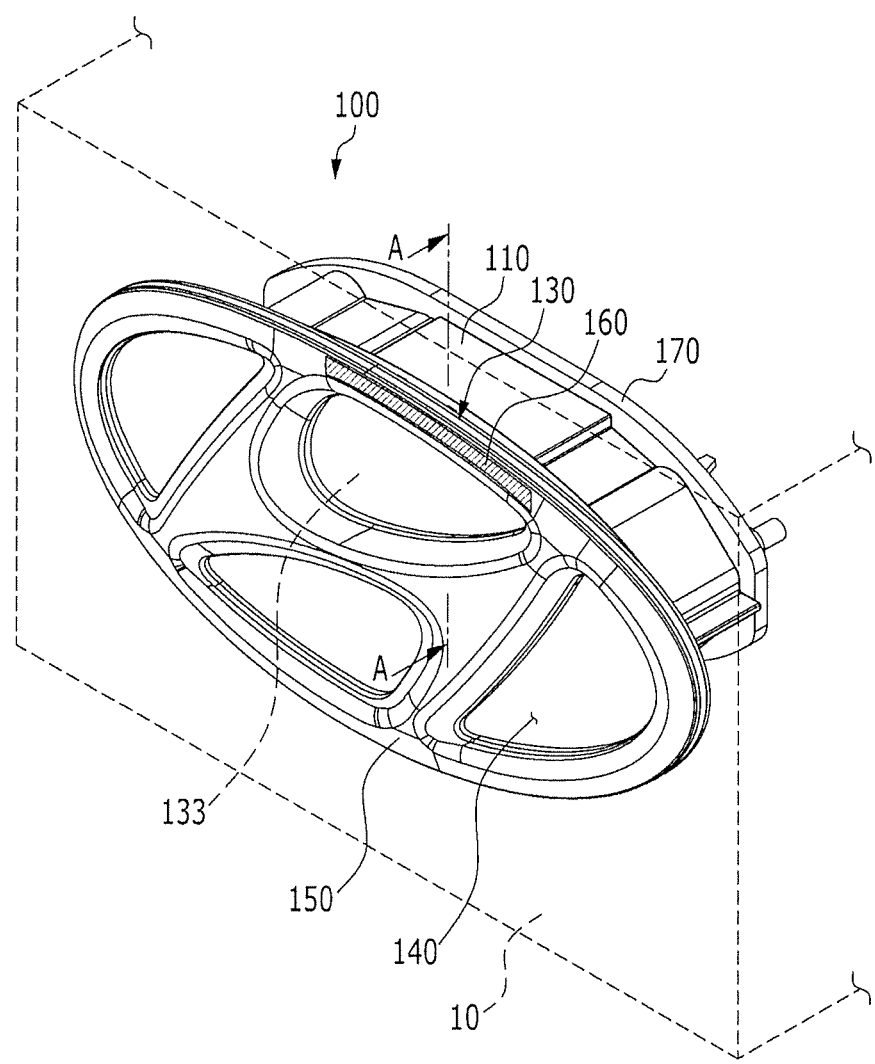
FIG. 1 is a perspective view of a trunk switch module for a vehicle according to an exemplary embodiment of the present disclosure.

An exemplary embodiment of the present disclosure will hereinafter be described in detail with reference to the accompanying drawings.

Prior to this, configurations illustrated in the exemplary embodiments and drawings disclosed in the present specification are only the most preferred embodiment of the present disclosure and do not represent all of the technical spirit of the present disclosure, and thus it is to be understood that various equivalents and modified examples, which may replace the configurations, are possible when filing the present application.

The drawings and description are to be regarded as illustrative in nature and not restrictive and like reference numerals designate like elements throughout the specification.

Since size and thickness of each component illustrated in the drawings are arbitrarily represented for convenience in explanation, the present disclosure is not particularly limited to the illustrated size and thickness of each component and the thickness is enlarged and illustrated in order to clearly express various parts and areas.

In addition, throughout the specification, unless explicitly described to the contrary, the word "comprise" and variations such as "comprises" or "comprising", will be understood to imply the inclusion of stated elements but not the exclusion of any other elements.

In addition, the terms "unit", "means", "part", and "member", which are described in the specification, mean a unit of a comprehensive configuration that performs at least one function or operation.

Figure 2:
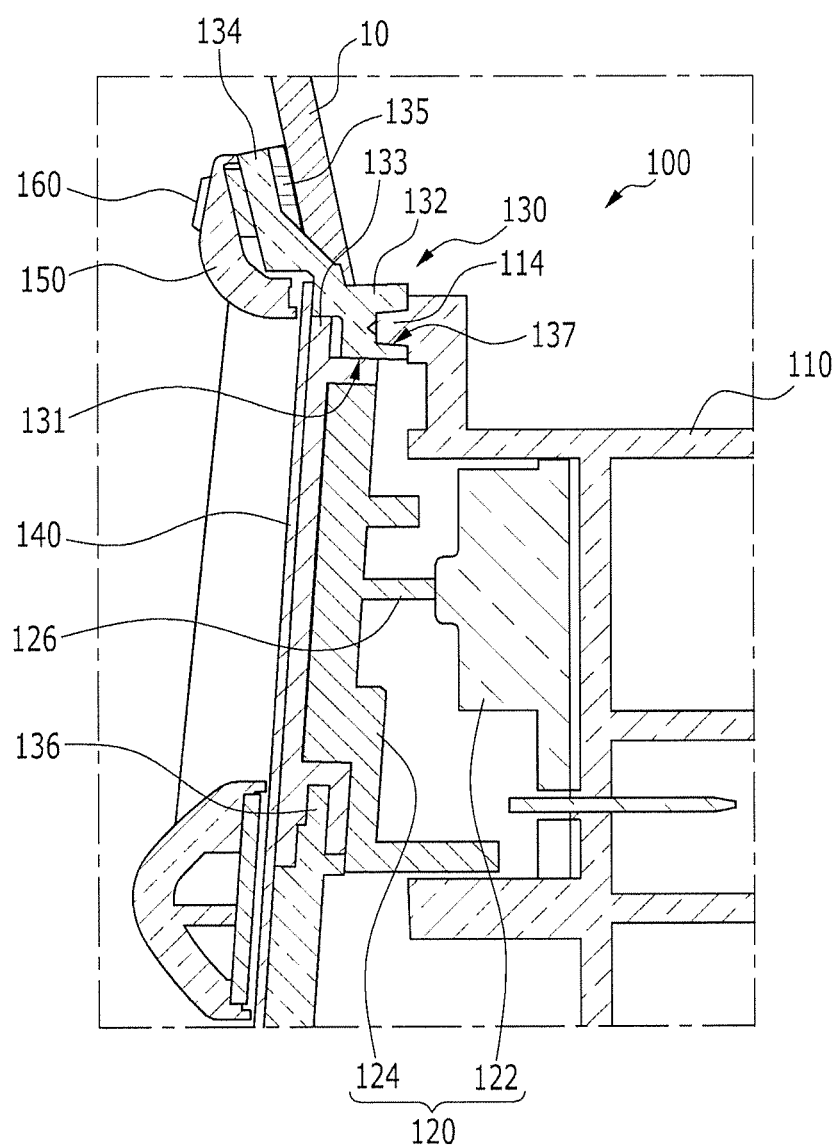
FIG. 2 is a cross-sectional view taken along line A-A of FIG. 1.
Figure 3:
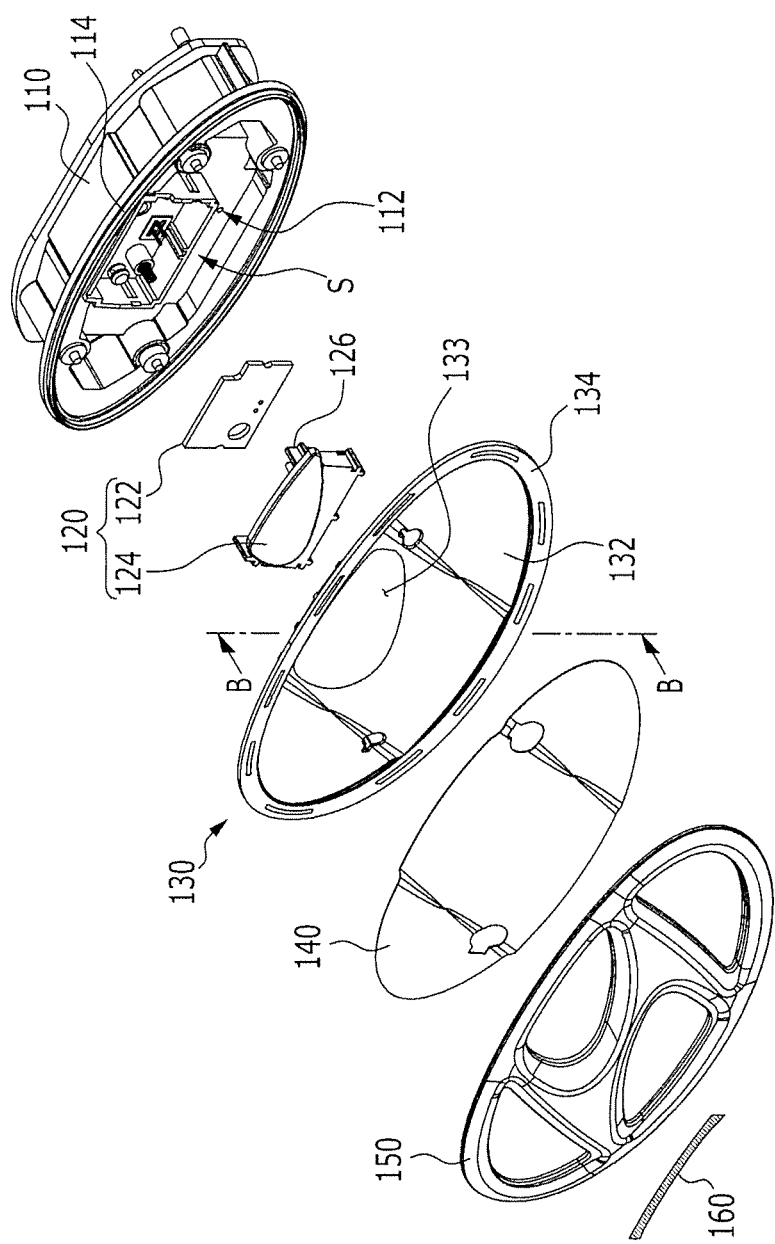
FIG. 3 is an exploded perspective view of the trunk switch module for a vehicle according to an exemplary embodiment of the present disclosure.
Figure 4:
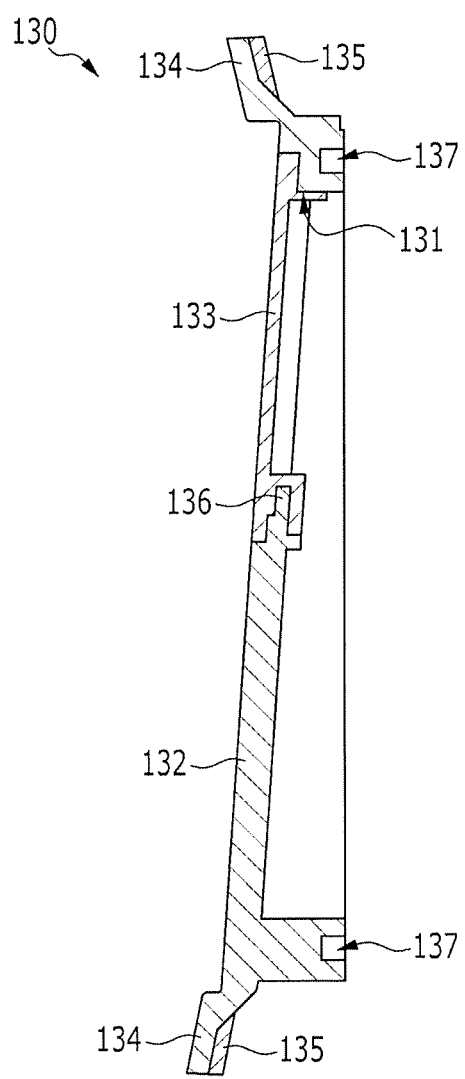
FIG. 4 is a cross-sectional view of a cover assembly, as a cross-sectional view taken along line B-B of FIG. 3, applied to the trunk switch module for a vehicle according to an exemplary embodiment of the present disclosure.

FIG. 1 is a perspective view of a trunk switch module for a vehicle according to an exemplary embodiment of the present disclosure, FIG. 2 is a cross-sectional view taken along line A-A of FIG. 1, FIG. 3 is an exploded perspective view of the trunk switch module for a vehicle according to an exemplary embodiment of the present disclosure, and FIG. 4 as a cross-sectional view taken along line B-B of FIG. 3 is a cross-sectional view of a cover assembly applied to the trunk switch module for a vehicle according to an exemplary embodiment of the present disclosure.

Referring to drawings, a trunk switch module 100 for a vehicle according to an exemplary embodiment of the preset disclosure prevents water from being introduced to the inside of a trunk through a trunk switch 120 by integrally providing a button sealing unit 133 to correspond to the trunk switch 120 positioned at an upper portion of an emblem 150 and adopting a cover assembly 130 to which a protection film 140 is applied to enhance watertightness and prevent an operation malfunction phenomenon of the trunk switch 120 due to freezing of the water, thereby enhancing switch operating performance.

To this end, the trunk switch module 100 according to an exemplary embodiment of the present disclosure includes a housing 110, the trunk switch 120, the cover assembly 130, the protection film 140, and the emblem 150.

First, a rear side of the housing 110 is partially inserted into a trunk lid 10 provided in the vehicle, and a front side of the housing 110 is opened to form a mounting space S in the housing 110. The trunk switch 120 is provided in the mounting space S.

The housing 110 may be configured by an elliptical box of which a cross section has an elliptical shape to correspond to a shape of the emblem 150.

Herein, an air vent hole 112 may be formed at one side of a lower end of the housing 110 for ventilation in the mounting space S.

When the cover assembly 130 is mounted on the housing 110 to seal the mounting space S, the air vent hole 112 may release pressure generated in the mounting space S so as to prevent the trunk switch 120 from being not actuated due to internal pressure of the mounting space S.

That is, the air vent hole 112 allows the mounting space S to be in communication with the outside.

A mounting pad 170 for fixing the housing 110 in the trunk lid 10 may be mounted on the rear side of the housing 110 configured as such.

In the exemplary embodiment, the trunk switch 120 is mounted on the mounting space S so as to selectively open the trunk lid 10 according to an operation of a user.

Herein, the trunk switch 120 includes a tack switch 122 and a push block 124.

First, the tack switch 122 is mounted inside the rear side of the housing 110 in the mounting space S.

Herein, the tack switch 122 may be electrically connected with a latch (not illustrated) provided in the trunk lid 10.

That is, the tack switch 122 as a printed circuit board (PCB) integrated switch is electrically connected to the latch through a wiring. Since the tack switch as a general tack switch applied to the trunk switch 120 corresponds to known technology, a detailed description of a structure and a function of the tack switch 122 will be hereinafter omitted.

In addition, the push block 124 is mounted on the mounting space S to move forward and backward to correspond to the tack switch 122 so as to selectively contact the tack switch 122.

The push block 124 may turn on or off the tack switch 120 while selectively contacting the tack switch 122.

A contact protrusion 126 contacting the tack switch 122 may be formed at the rear of the push block 124.

The contact protrusion 126 protrudes to the rear of the push block 124 by a predetermined length. Accordingly, when actuation force of the user is applied to the push block 124, the push block 124 may smoothly contact the tack switch 122 through the contract protrusion 126.

Herein, a spring (not illustrated) is interposed between a rear surface of the push block 124 and an inner surface of the mounting space S. When external force is not applied to the push block 124, the spring provides elastic restoration force to the push block 124 to continuously return the push block 124 to an initial position.

Meanwhile, a magnitude of the actuation force applied to the push block 124 may be controlled by adjusting a length of the contact protrusion 126 or controlling elastic force of the spring (not illustrated). That is, the magnitude of the actuation force of the push block 124 may be controlled according to a request of the user to satisfy the request of the user.

In the exemplary embodiment, the cover assembly 130 is mounted on a front surface of the housing 110 so as to close the opened front surface of the housing 110. The button sealing unit 133 is integrally formed in the cover assembly 130 to correspond to the trunk switch.

In addition, the protection film 140 is attached onto the front surface of the cover assembly 130. The emblem 150 is mounted on the cover assembly 130 at the front of the protection film 140.

Herein, the cover assembly 130 further includes a main body 132, a flange unit 134, and a vehicle body sealing unit 135.

First, the main body 132 has the same shape as the front surface of the housing 110. A mounting hole 131 is formed at an upper portion of the main body 132 to correspond to the trunk switch 120 so that the button sealing unit 133 is provided in the main body 132.

The button sealing unit 133 may prevent the push block 124 of the trunk switch 120 from being exposed to the outside through the mounting hole 131. At the same time, the button sealing unit 133 may prevent water or foreign materials from being introduced into the mounting space S through a space between the push block 124 and the mounting hole 131.

In an exemplary embodiment, the flange unit 134 is integrally formed on an outer circumference of the main body 110. In addition, the vehicle body sealing unit 135 is integrally formed on the rear surface of the flange unit 134.

That is, the rear surface of the flange unit 134 contacts the trunk lid 10 when the trunk switch module 100 is mounted on the trunk lid 10. In this case, the vehicle body sealing unit 135 may prevent the flange unit 134 from directly contacting the trunk lid 10 and minimize friction.

Herein, the button sealing unit 133 and the vehicle body sealing unit 135 may be insert-injected into the main body 132 and the flange unit 134, respectively.

The button sealing unit 133 and the vehicle body sealing unit 135 may be a thermoplastic poly urethane (TPU) material.

Since the TPU material as a material which has large durability and is not well abraded corresponds to widely known technology, a more detailed description of the TPU material will be hereinafter omitted.

In an exemplary embodiment, an engagement protrusion 136 may be integrally formed in the main body 110 so that a lower part of the button sealing unit 133 covers the outer circumference below the mounting hole 131.

That is, the button sealing unit 133 is mounted in the mounting hole 131 of the main body 132 while covering the outer circumference of the engagement protrusion 136 during insert-injection to be stably formed in the main body 132.

Herein, a coupling groove 137 may be formed on a rear surface of the main body 132 to correspond to a coupling protrusion 114 formed in the housing 110.

Further, the main body 132 may be coupled to the housing 110 through ultrasonic fusion while the coupling protrusion 114 is inserted into the coupling groove 137.

As a result, the cover assembly 130 is ultrasonically fused to the front surface of the housing 110 to seal the mounting space S of the housing 110.

The front surface of the main body 132 may be painted with the same color as the trunk lid 10 which is a body of the vehicle.

As a result, the protection film 140 may be formed by an anti-chipping film that protects a painted surface painted on the front surface of the main body 132.

In addition, a label tape 160 may be attached onto the emblem 150 so that the position of the trunk switch 120 is displayed on an upper front surface corresponding to the trunk switch 120.

That is, the user may easily recognize and operate the position of the trunk switch 120 hidden at the rear of the button sealing unit 133 in the cover assembly 130 painted through the label tape 160.

In the trunk switch module 100 configured as such, the cover assembly 130, in which the button sealing unit 133 is integrally formed, enables the user to operate the trunk switch 120 mounted in the mounting space S and prevents the trunk switch 120 from being exposed to the outside to prevent the water or the foreign materials from being introduced into the housing 110.

Accordingly, when the trunk switch module 100 for a vehicle according to an exemplary embodiment of the preset disclosure, which is configured as above is applied, the water is prevented from being introduced to the inside of the trunk through the trunk switch 120 by integrally providing the button sealing unit 133 to correspond to the push block 124 positioned at the upper portion of the emblem 150 and adopting the cover assembly 130 to which the protection film 140 is applied to enhance watertightness and prevent an operation malfunction phenomenon of the trunk switch 120 due to freezing of the water, thereby enhancing switch operating performance.

Further, the trunk switch 120 is integrally configured in the emblem 150 and a paint having the same color as the vehicle is applied to the cover assembly 130 to enhance a degree of design freedom of the trunk lid 10.

In addition, in the trunk switch module 100 for a vehicle according to an exemplary embodiment of the present disclosure, the vehicle body sealing unit 135 is integrally formed on a rear surface of the cover assembly 130 contacting the vehicle body to minimize friction with a vehicle body painting surface and enhance sealing performance.

Furthermore since the watertightness can be enhanced by applying the cover assembly 130 without a separate waterproof device, a structure can be simplified and manufacturing cost can be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A trunk switch module for a vehicle, comprising:
a housing, of which a rear side is partially inserted into a trunk lid of the vehicle, having a mounting space at a front side of the housing;
a trunk switch disposed in the mounting space to selectively open the trunk lid according to an operation of a user;
a cover assembly attached to a front edge of the housing to close the opened front side of the housing, the cover assembly having a button sealing unit which corresponds to the trunk switch;
a protection film attached to a front surface of the cover assembly; and
an emblem mounted on the cover assembly at a front side of the protection film,
wherein the housing includes an air vent hole at one end of the housing for ventilating the mounting space, and
wherein, when the cover assembly is mounted on the housing to seal the mounting space, pressure generated in the mounting space is released through the air vent hole to prevent the trunk switch from not being actuated due to the pressure in the mounting space,
wherein the cover assembly includes:
a main body having a mounting hole at an upper portion of the main body to correspond to the trunk switch so that the button sealing unit is disposed in the mounting hole;
a flange unit integrally formed on an outer circumference of the main body; and
a vehicle body sealing unit integrally formed on a rear surface of the flange unit,
wherein the main body includes, below the mounting hole, an engagement protrusion integrally formed in the main body so that a lower part of the button sealing unit covers the outer circumference of the main body,
wherein the main body includes, on a rear surface thereof, a coupling groove corresponding to a coupling protrusion of the housing,
wherein the main body is coupled to the housing through ultrasonic fusion while the coupling protrusion is inserted into the coupling groove,
wherein a label tape is attached to the emblem so that the trunk switch is disposed on an upper front surface of the emblem, and
wherein the housing includes a mounting pad for fixing the housing in the trunk lid at the rear side of the housing.

2. The trunk switch module of claim 1, wherein:
the button sealing unit and the vehicle body sealing unit are insert-injected into the main body and the flange unit, respectively.

3. The trunk switch module of claim 1, wherein:
the button sealing unit and the vehicle body sealing unit are formed of thermoplastic poly urethane (TPU) materials.

4. The trunk switch module of claim 1, wherein:
the front side of the main body has the same color as a body of the vehicle.

5. The trunk switch module of claim 4, wherein:
the protection film is an anti-chipping film that protects a painted surface on the front surface of the main body.

6. The trunk switch module of claim 1, wherein the trunk switch includes:
a tack switch mounted on the rear side of the housing; and
a push block disposed in the mounting space and moving, forward and backward to correspond to the tack switch, the push block to selectively contacting the tack switch and turning on or off the tack switch while selectively contacting the tack switch.

7. The trunk switch module of claim 6, wherein:
the push block includes a contact protrusion contacting the tack switch at a rear side of the push block.

* * * * *